Dec. 3, 1935.   M. B. MORGAN   2,023,338
SEALING DEVICE AND ASSEMBLY FOR ROTATING SHAFTS
Filed Jan. 13, 1934
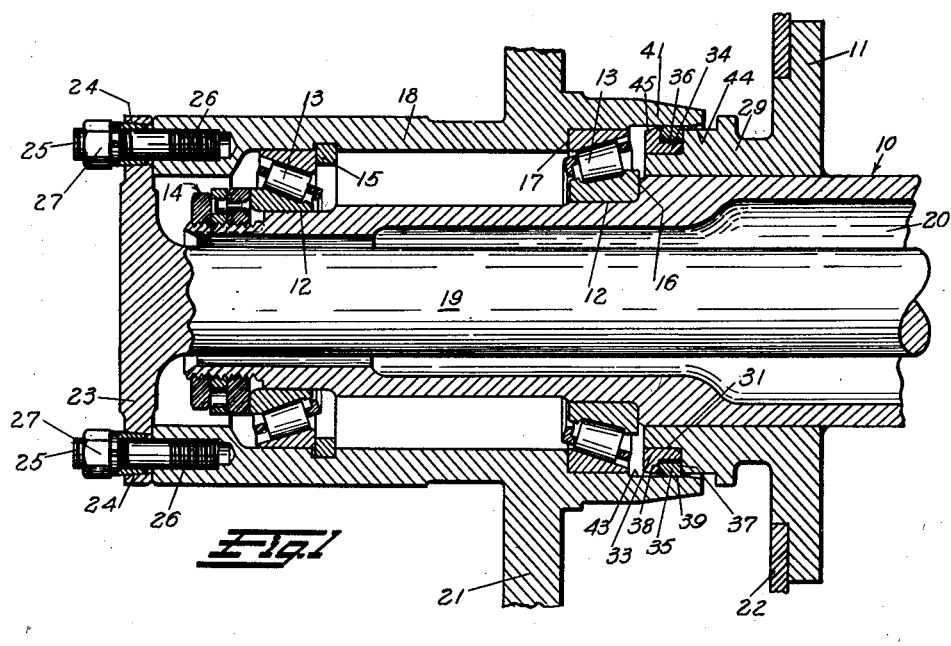
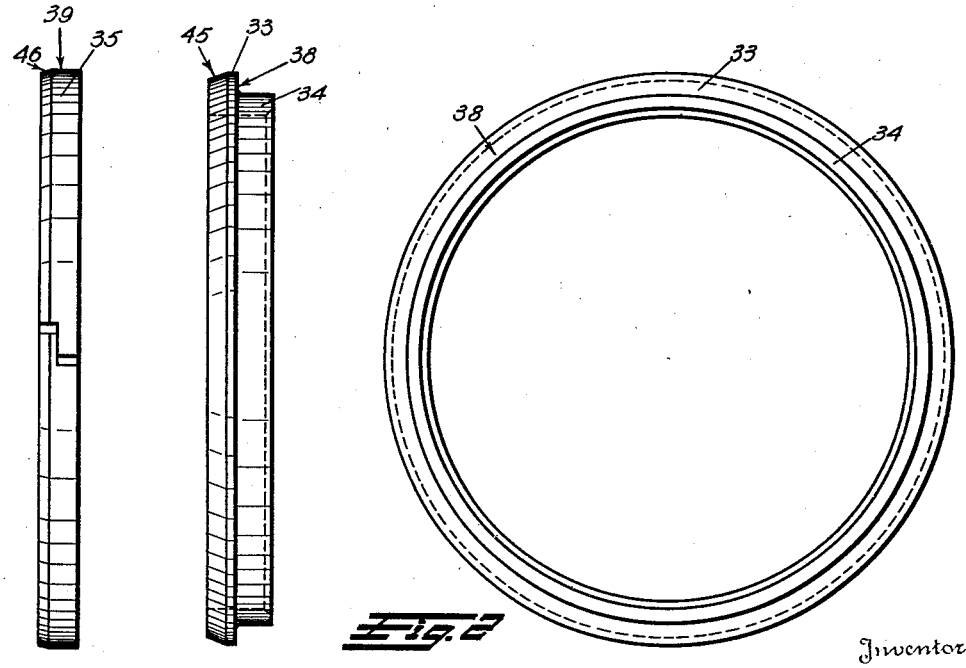
Inventor
Mathew B. Morgan
By Strauch + Hoffman
Attorneys Patented Dec. 3, 1935

2,023,338

UNITED STATES PATENT OFFICE 2,023,338

SEALING DEVICE AND ASSEMBLY FOR ROTATING SHAFTS

Mathew B. Morgan, Detroit, Mich., assignor to The Timken-Detroit Axle Company, Detroit, Mich., a corporation of Ohio Application January 13, 1934, Serial No. 706,543

4 Claims. (Cl. 286—7)

This invention relates to improved means for preventing the escape of liquid such as lubricant from rotating rods, shafts, wheel hubs and the like.

More specifically this invention relates to improved means for preventing the loss of lubricant from the antifriction bearings associated with structures of the above mentioned character.

Although this invention may be used in any instance where it is desired to seal a rotating rod or shaft the novel sealing means will be described in connection with the sealing of a conventional wheel hub of an automotive vehicle axle.

It is common knowledge that a great deal of trouble has been encountered in attempting to efficiently seal the driven axle load supporting bearings against loss of lubricant. Many devices have been proposed to remedy this trouble but none has been found entirely satisfactory. The primary difficulty encountered with all of the prior devices is that the lubricant tends to leak axially, through the bearings at the annular opening between the wheel hub and the housing sleeve upon which the bearings are mounted, into the brake drum. This undesirable leakage is responsible for two very serious results, namely, the saturation of the brake shoes with lubricant and the failure of proper lubrication of the bearings. Both of these results are very troublesome and costly to the operator.

I have found that a split inherently resilient ring that will expand and contract radially, provides a more effective seal than any previously proposed. However, I have encountered difficulties in assembling a ring of this type, and particularly in assembling it without damage that will materially reduce its efficiency in subsequent use. These difficulties are as follows.

Such a ring will be mounted upon one of the relatively rotatable members and have a cylindrical surface urged radially into sealing contact with the other member. In the case of a wheel hub and axle assembly the ring will be carried in a groove provided by means on the axle and will expand outwardly into sealing contact with the hub bore. The most natural way of mounting the ring on the axle would be to provide a peripheral groove on the end of the axle at the proper point or upon any structure which is rigidly carried by the axle at that point. However, if the ring is assembled in this manner it is likely to become permanently distorted due to the necessity of opening the split ring beyond its normal limit of expansion in order to associate it with its retaining groove. Such expansion frequently causes the ring to assume a slight elliptical shape which prevents the wheel hub from being axially assembled upon the axle without causing further damage thereto. Even though extreme care be used in assembling the wheel hub so that no further injury be caused, the seal provided by the ring may not be perfect since any permanent distortion caused when snapping the ring into position, will cause the ring to contact only throughout a part of its entire sealing surface.

It is, therefore, a primary object of the present invention to provide a radially resilient ring seal for relatively rotatable parts that is highly efficient, simple to manufacture and easy to assemble.

A further major object of the present invention resides in the provision of an expanding ring seal for relatively rotatable parts that is adapted to be assembled in such a manner that distortion of the ring and the undesirable characteristics incident to such distortion are entirely eliminated.

In this connection a specific object of the present invention resides in the provision of an oil seal having an expansible ring that can be assembled with the structure to be sealed without utilizing specially designed means for retaining the ring in its contracted position during the assembling operation.

A further object of the present invention is to provide a novel two-part ring holder or adapter which is capable of being conveniently disassembled to receive the ring without forcibly expanding the latter thereby eliminating all harmful distortion of the ring.

Another object of the present invention is to provide a two part adapter wherein one part forms a pilot for an expanding ring and may be associated with its complemental part thereby forming an assembly which provides a groove for the expanding ring.

A further object of the present invention resides in the provision of a sealing device, for use in sealing lubricant within the wheel bearings of an automotive vehicle drive axle, comprising a unitary assembly located adjacent the inner end of the wheel hub in a manner permitting the wheel hub to be readily assembled and replaced without the necessity of forcibly contracting the expanding ring in order to assemble the hub with respect to the bearing assembly and seal ring.

Further objects will become apparent as the description proceeds in connection with the appended claims and accompanying drawing.

In the drawing:

Figure 1 is a longitudinal sectional view of a conventional drive axle and wheel hub assembly embodying the novel oil seal of the present invention.

Figure 2 is a view on an enlarged scale of one lateral face of the pilot for the expanding ring of Figure 1.

Figure 3 is a side elevational view of the ring pilot shown in Figure 2.

Figure 4 is an enlarged elevational view of the expanding ring utilized in Figure 1.

With continued reference to the drawing the numeral 10 designates generally one end of an axle housing sleeve of the "full floating" type. The housing sleeve 10 is adapted to receive a brake spider 11 which is fixedly mounted thereon in any suitable manner. Housing 10 also provides seats 12 for the reception of the usual bearing assemblies 13. The outer bearing 13 is retained upon its seat 12 by the usual adjusting and locking assembly 14 and a split expanding ring 15. Inner bearing 13 is retained upon its seat by means of a shoulder 16 formed upon axle housing 10 abutting one face thereof and by shoulder 17 formed in a wheel hub 18 which takes the form of an open sleeve in the illustrated embodiment. It is to be understood, however, that any conventional wheel hub may be used. The wheel hub 18 is assembled upon the housing by sliding it over the outer end of housing 10. After hub 18 is in its assembled position and adjustably held therein by the assembly 14, a drive axle shaft 19 is inserted within the chamber 20 of axle housing 10 and its splined inner end (not seen) is received in the differential mechanism (not shown) utilized in vehicle drives of this character.

The hub 18 has a radial flange 21 forming a support for mounting the wheel and part of a brake drum which cooperates with a closure plate 22 on the spider 11 to form in the usual manner, a chamber for the brake shoes and related brake mechanism (not shown).

The outer end of axle shaft 19 has an integral flange 23 that is provided with apertures 24 adapted to freely receive the protruding end 25 of studs 26 which are associated with hub 18. Nut and washer assemblies 27 are screwed on studs 26 and cause flange 23 to be operatively connected to hub 18. From the foregoing description it will be apparent that the wheel hub 18, drive axle 19, and bearing assemblies 13 are all retained in position with respect to housing 10 by means of the adjusting and locking assembly 14.

The structure so far described is well known in the art and therefore directly forms no part of the present invention.

In constructions of the above character it is necessary to devise some manner for sealing the inner end of the hub against loss of bearing lubricant, for otherwise the lubricant would escape through the inner bearing assembly 13 and thence into the brake drum, thus to leave the bearings in an improperly lubricated condition and to cause slipping of the brakes. Prior sealing devices have not proved satisfactory for this purpose chiefly because they wear rapidly and develop leaks. Another difficulty in the past has been the lack of ease of assembly, and damage to the seal caused in getting it and the hub into operative relationship.

The present invention overcomes all of the above enumerated difficulties in the following manner.

The inner end of the sleeve 29 is provided with an annular reduced portion which is suitably machined to provide a seat 31. Seat 31 is adapted to receive an annular adapter or pilot ring 33 (Figure 3). Ring 33 is recessed adjacent one face thereof to provide an annular ring-carrying extension 34. The extension 34 is adapted to freely receive an expanding resilient ring 35 which is associated therewith by moving ring 35 axially into position upon flange 34. It will thus be seen that the seal ring 35 may be associated with the pilot 33 without undergoing any distortion whatever.

In order that the seal may be assembled with respect to the axle it is only necessary to slide pilot ring 33, with seal ring 35 upon annular extension 34, axially upon the seat 31 provided on sleeve 29. Pilot 33 is retained in the latter position due to the frictional fit between it and the seat 31. When the pilot 33 is in position upon its seat 31 the ring 35 is positioned in a recess 36 which in effect is a groove. Recess 36 is defined by the wall 37 adjacent the seat 31, the extension 34 of pilot 33 and the upstanding wall 38 of the pilot 33. The ring 35 is so proportioned with respect to the extension 34 that it lies within recess 36 to form a seal therebetween but will nevertheless permit the ring to expand radially into sealing engagement with the internal bore 43 of hub 18.

With the assembly thus far described in its operative relation to axle housing sleeve 10 the external sealing surface 39 of ring 35, due to the inherent tendency of ring 35 to expand, will protrude a substantial distance beyond the confining and positioning device formed by pilot 33 and the sleeve 29. It is therefore necessary to cause a slight contraction of ring 35 before the annular extension 41 of hub 18 may be positioned in its assembled relation. In order to automatically accomplish the required contraction the extension 41 adjacent its open end is beveled or tapered throughout a relatively short distance, as at 44. Due to this short tapered portion 44 the hub 18 may be moved axially into its operative position and the portion 43 will force the ring 35 uniformly toward its fully contracted position. The assembling operation is further facilitated through the provision of a beveled surface 45 on the outer side of the pilot 33. Beveled surface 45 operates to pilot or center member 18 with respect to the pilot ring when the parts are moved axially during the assembly operation.

Furthermore, in order that the ring 35 will not be chipped or in any way injured when the hub 18 is slid thereover the edge of ring 35 adjacent wall 38 of pilot 33 is beveled at 46 (see Figure 4). When the hub approaches and reaches the ring, the taper 44 will first contact with bevel 46 and the two tapered surfaces will then cooperate to smoothly and easily compress the ring radially without any chance of damaging its cylindrical sealing surface.

It will now be apparent that the present invention provides an oil seal that is extremely efficient and that will automatically adjust itself radially when wear takes place. This latter feature is one of great importance since most inexpensive seals used prior to my invention would develop leaks in a relatively short time due to their inability to expand properly and take up all wear.

It is also to be understood that the present invention is capable of use where the outer sleeve is the member upon which the seal ring and its positioning and retaining means is mounted. In such a construction the seal ring will be of the radially contracting type wherein the sealing contact of the ring is formed by the inner cylindrical surface which would be in contact with the inner member.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a sealing device, inner and outer concentrically disposed members mounted for relative rotation and providing spaced cylindrical walls, one of said members having a smooth cylindrical sealing surface and said other member having a face disposed substantially normal to the axis of said members, a pilot ring associated with said last-mentioned member and adapted, when disposed in final rigidly assembled position upon said last-mentioned member, to present a face parallel to, but axially spaced from said normal face to define an annular sealing-ring receiving groove, a flexible metallic sealing ring disposed in said groove, said sealing ring being adapted to be put in place against the face of said other member prior to assembly of said pilot ring thereupon, to thereby obviate the necessity for flexing, and possibly distorting said ring by springing it into said sealing-ring receiving groove, said sealing ring having a smooth cylindrical surface lying in surface engagement with and accurately conforming to the smooth cylindrical sealing surface of said one member and having sufficient inherent resilience to build up sufficient pressure between said sealing surfaces to establish a frictional coupling therebetween to thereby insure synchronous rotation of said sealing ring with said one member, with said sealing surfaces disposed in static, fluid-sealing engagement, the sides of said sealing ring being disposed in movable but sealing relationship with the parallel faces of said other member and said pilot ring.

2. In a sealing device, inner and outer concentrically disposed members mounted for relative rotation and providing spaced cylindrical walls, said outer member having a smooth cylindrical sealing surface and said inner member having a face disposed substantially normal to the axis of said members, a pilot ring associated with said inner member and adapted, when disposed in final rigidly assembled position upon said inner member, to present a face parallel to, but axially spaced from the normal face to said inner member to define an annular sealing-ring receiving groove, a flexible metallic sealing ring adapted to be put in place between said inner member and said pilot ring prior to assembly of said pilot ring upon said inner member, to thereby obviate the necessity for flexing, and possibly distorting said ring by springing it into said sealing-ring receiving groove, said inner member having a smaller diameter cylindrical portion upon which said pilot ring is adapted to be rigidly supported, said sealing ring having a smooth cylindrical surface lying in surface engagement with and accurately conforming to the smooth cylindrical sealing surface of said outer member and having an inherent tendency to expand and build up sufficient pressure between said sealing surfaces to insure synchronous rotation of said sealing ring with said outer member, the sides of said sealing ring being disposed in movable but sealing relationship with the parallel faces of said inner member and said pilot ring.

3. The sealing device described in claim 2, wherein said outer member, adjacent the smooth cylindrical sealing surface thereof, is provided with a tapered wall of comparatively small angle which increases in diameter toward the open end of said outer member, for contacting and positively camming said sealing ring into said groove when said members are assembled by moving them relatively in an axial direction.

4. The sealing device described in claim 2, wherein said outer member, adjacent the smooth cylindrical sealing surface thereof, is provided with a tapered wall of comparatively small angle and which decreases in diameter towards and merges into said smooth sealing surface, for contacting and positively camming said sealing ring into said groove when said members are assembled by moving them relatively in an axial direction, said sealing ring, in the region thereof which is initially contacted by said tapered surface, being provided with a surface tapered in the same direction as the tapered wall of said outer member.

MATHEW B. MORGAN.